(12) United States Patent
Dejneka et al.

(10) Patent No.: US 11,236,017 B2
(45) Date of Patent: Feb. 1, 2022

(54) COMPOSITIONAL MODIFICATION OF GLASS ARTICLES THROUGH LASER HEATING AND METHODS FOR MAKING THE SAME

(71) Applicant: CORNING INCORPORATED, Corning, NY (US)

(72) Inventors: Matthew John Dejneka, Corning, NY (US); Stuart Gray, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 39 days.

(21) Appl. No.: 16/334,948

(22) PCT Filed: Sep. 21, 2017

(86) PCT No.: PCT/US2017/052674
§ 371 (c)(1),
(2) Date: Mar. 20, 2019

(87) PCT Pub. No.: WO2018/063910
PCT Pub. Date: Apr. 5, 2018

(65) Prior Publication Data
US 2020/0024188 A1    Jan. 23, 2020

Related U.S. Application Data

(60) Provisional application No. 62/401,364, filed on Sep. 29, 2016.

(51) Int. Cl.
*B23K 26/40* (2014.01)
*B23K 26/36* (2014.01)
(Continued)

(52) U.S. Cl.
CPC ...... *C03C 23/0025* (2013.01); *B23K 26/0648* (2013.01); *B23K 26/082* (2015.10);
(Continued)

(58) Field of Classification Search
CPC .... B23K 26/40–402; B23K 26/36–362; B23K 26/352–354; B23K 26/16;
(Continued)

(56) References Cited

U.S. PATENT DOCUMENTS

| | | |
|---|---|---|
| 4,244,721 A | 1/1981 | Gupta et al. |
| 4,731,254 A | 3/1988 | Heineken et al. |

(Continued)

FOREIGN PATENT DOCUMENTS

| | | |
|---|---|---|
| EP | 0326037 B1 | 8/1993 |
| JP | 62-207728 A | 9/1987 |

(Continued)

OTHER PUBLICATIONS

International Search Report and Written Opinion of the International Searching Authority; PCT/US2017/052674 dated Dec. 6, 2017; 12 Pages; European Patent Office.

(Continued)

*Primary Examiner* — Michael A Laflame, Jr.
(74) *Attorney, Agent, or Firm* — John P. McGroarty (57) ABSTRACT

Glass articles and methods for modifying a composition of a surface portion of the glass article are disclosed. The method includes heating the surface portion of the glass article with a laser beam to a temperature within a range of about 1100?C to about 2200?C such that the heating evaporates one or more metalloids and/or one or more alkali metals present at the surface portion, and modifies the composition of the surface portion such that the surface portion has a lower alkali metals concentration and/or a lower metalloids concentration as compared to a portion of the glass article that is not heated by the laser beam.

13 Claims, 5 Drawing Sheets

(51) Int. Cl.
  *B23K 26/16* (2006.01)
  *C03C 23/00* (2006.01)
  *B23K 26/082* (2014.01)
  *B23K 26/354* (2014.01)
  *B23K 26/06* (2014.01)
  *C03C 3/089* (2006.01)
  *C03C 3/097* (2006.01)
  *C03C 4/00* (2006.01)
  *C03C 3/091* (2006.01)
  *B23K 103/00* (2006.01)

(52) U.S. Cl.
  CPC .......... *B23K 26/354* (2015.10); *B23K 26/40* (2013.01); *C03C 3/089* (2013.01); *C03C 3/091* (2013.01); *C03C 3/097* (2013.01); *C03C 4/0071* (2013.01); *B23K 2103/54* (2018.08); *C03C 2203/52* (2013.01); *C03C 2204/00* (2013.01)

(58) Field of Classification Search
  CPC .......... B23K 2103/54; C03B 19/06066; C03B 33/10–102; C03C 23/0025; C03C 25/6208
  See application file for complete search history.

(56) References Cited

U.S. PATENT DOCUMENTS

| | | | |
|---|---|---|---|
| 4,848,998 A | 7/1989 | Snitzer et al. | |
| 5,178,658 A | 1/1993 | Tumminelli et al. | |
| 5,648,172 A | 7/1997 | Jousse et al. | |
| 9,382,150 B2 | 7/2016 | Annamalai et al. | |
| 2001/0050364 A1* | 12/2001 | Tanaka | H01L 29/78645 257/66 |
| 2014/0245608 A1* | 9/2014 | Morimoto | B23K 26/1224 29/890.1 |
| 2015/0368141 A1 | 12/2015 | Bergman et al. | |
| 2017/0326688 A1* | 11/2017 | Turner | B23K 26/382 |

FOREIGN PATENT DOCUMENTS

| | | |
|---|---|---|
| JP | 63-060118 A | 3/1988 |
| JP | 07-507762 A | 8/1995 |
| JP | 08-264642 A | 10/1996 |
| JP | 11171599 A | 6/1999 |
| JP | 11-278875 A | 10/1999 |
| JP | 2002012436 A | 1/2002 |
| JP | 2010-070399 A | 4/2010 |
| KR | 2014131449 A | 11/2014 |
| WO | 2009/078324 A1 | 6/2009 |

OTHER PUBLICATIONS

Taylor et al; "Boron Loss in Furnace- And Laser-Fired, Sol-Gel Derived Borosilicate Glass Films"; Journal of Materials Research, vol. 11, No. 8, pp. 1870-1873 (1996.

Japanese Patent Application No. 2019-516628, Office Action dated Oct. 29, 2021, 10 pages (5 pages of English Translation and 5 pages of Original Document), Japanese Patent Office.

* cited by examiner

FIG. 9

COMPOSITIONAL MODIFICATION OF GLASS ARTICLES THROUGH LASER HEATING AND METHODS FOR MAKING THE SAME

CROSS-REFERENCE TO RELATED APPLICATIONS

This application is a national stage entry of International Patent Application Serial No. PCT/US2017/052674 filed on Sep. 21, 2017, which claims the benefit of priority under 35 U.S.C. § 119 of U.S. Provisional Application Ser. No. 62/401,364 filed on Sep. 29, 2016, the content of which is relied upon and incorporated herein by reference in its entirety.

BACKGROUND

Field

The present specification generally relates to glass articles, and more specifically, to glass articles having one or more compositionally changed surface portions as compared to a bulk portion of the glass article, as well as to methods for making such glass articles.

Technical Background

Glass articles may be obtained from glass sheets using down draw methods, such as fusion draw. Glass articles may be mechanically separated from a ribbon at a draw housing, and then subjected to various downstream processes. After the glass article is separated from the ribbon, laser processing may be used in finishing processes applied at various edges of a glass article. During such separation and finishing processes, it has been found that the edges of the glass sheets are particularly weak, and are prone to breakage or shattering.

Therefore, there is a need for finishing processes that not only finish the edges of the glass articles, but also strengthen the edges to prevent breakage or shattering.

SUMMARY

In some embodiments, a method of modifying a composition of a surface portion of a glass article includes heating the surface portion of the glass article with a laser beam to a temperature within a range of about 1100° C. to about 2200° C., such that the heating evaporates one or more metalloids and/or one or more alkali metals present at the surface portion, and modifies the composition of the surface portion such that the surface portion has a lower alkali metals concentration and/or a lower metalloids concentration as compared to a portion of the glass article that is not heated by the laser beam.

In some embodiments, a glass article includes a bulk portion, and a surface portion surrounding the bulk portion. The surface portion has a lower alkali metal concentration and/or a lower metalloid concentration as compared to the bulk portion.

In some embodiments, an optical waveguide device includes a glass article, the glass article having a bulk portion and a surface portion surrounding the bulk portion. The surface portion has a lower alkali metal concentration and/or a lower metalloid concentration as compared to the bulk portion. The optical waveguide device further includes an optical waveguide disposed within at least one of the surface portion and the bulk portion, such that the optical waveguide is operable to propagate optical signals therein.

In some embodiments, an electronic device includes an electronic display and a glass cover. The glass cover is disposed over the electronic display, and includes a bulk portion and a surface portion surrounding the bulk portion, the surface portion having a lower alkali metal concentration and/or a lower metalloid concentration as compared to the bulk portion.

Additional features and advantages for compositional modification of glass articles through laser heating and methods for making the same described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of glass articles and methods of their manufacture, examples of which are illustrated in the accompanying drawings. Whenever possible the same reference numerals will be used throughout the drawings to refer to the same or like parts. In accordance with the present disclosure, a glass article having a bulk portion and a surface portion is provided, where the surface portion has a lower alkali metal concentration and/or a lower metalloid concentration as compared to the bulk portion. Due to the lower alkali metal concentration and/or metalloid concentration, the surface portion has a lower coefficient of thermal expansion, and is more receptive to ion-exchange processes than the bulk portion, thereby increasing the strength of the edge portion. The alkali concentration and/or the metalloid concentration is lowered by heating the edge portions to temperatures within a range of about 1100° C. to about 2200° C. which evaporates one or more alkali metals and/or one or more metalloids, thereby modifying the compositional properties of the edge portion. The composition of the bulk portion that is not heated remains unchanged.

Figure 1:
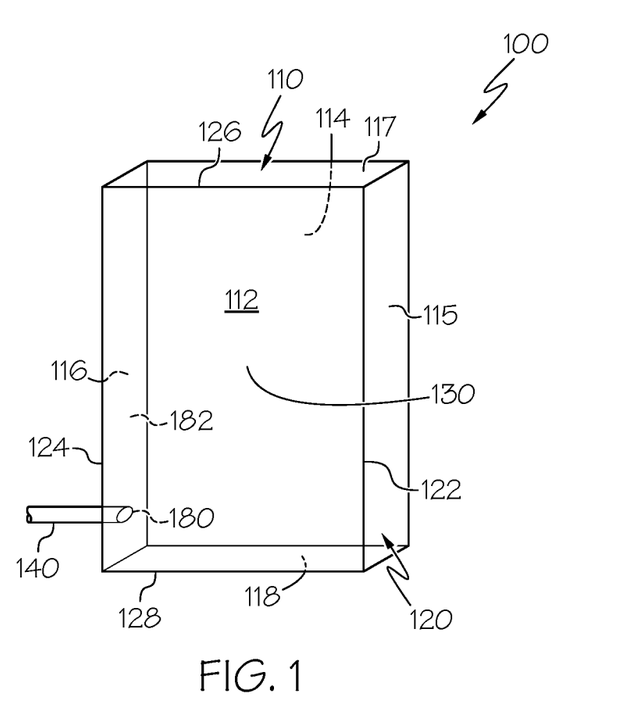
FIG. 1 schematically depicts an example glass article having surface portions, a bulk portion, edge portions and edges, according to one or more embodiments shown and described herein.

Referring now to FIG. 1, an example glass article 100 is schematically depicted. The glass article 100 includes surface portions 110 and a bulk portion 130. Surface portions 110 may be a portion of a major surface 112, 114 or a minor surface 115, 116, 117, 118 of the glass article 100. In one embodiment, the surface portion 110 may be a part or a point on the major surface 112, 114 or the minor surface 115, 116, 117, 118. As used herein, "major surface" with respect to the glass article is a surface having a larger area than a "minor surface". As an example, the minor surfaces 115, 116, 117, 118 of a glass article configured as a glass sheet are the edges of the glass sheet. Further, the bulk portion 130 may be a portion of the glass article 100 that is between the major surfaces 112, 114 and the minor surfaces 115, 116, 117, 118. A portion at which the glass article 100 is exposed to the laser beam 140 is a treated portion 180, and a portion of the glass article 100 which is not exposed to the laser beam 140 is a non-treated portion 182. While FIG. 1 depicts the glass article 100 as rectangular in shape, the glass article 100 may be in any shape. In embodiments, the glass article 100 may be in the shape of a square, circle, polygon, oval, and the like.

The glass article 100 may be fabricated from strengthened or un-strengthened glass. In embodiments, the glass article 100 is chemically strengthened by an ion exchange process. As non-limiting examples, the glass article 100 may be borosilicate glass, alkali-aluminosilicate glass, alumino-borosilicate, alkali-aluminoborosilicate glass, and the like. In exemplary embodiments, the glass article 100 is a silicate glass having at least 5 mole % or at least 10 mole % of $R_2O$ and $B_2O_3$, where $R_2O$ may be one or more of $Li_2O$, $Na_2O$, $Rb_2O$ and $Cs_2O$. In other non-limiting examples, the glass article 100 is silicate glass including at least 5 mole % or 10 mole % of $R_2O$, $B_2O_3$, $ZnO$, $P_2O_5$, and $In_2O_3$, where $R_2O$ may be one or more of $Li_2O$, $Na_2O$, $Rb_2O$ and $Cs_2O$. In exemplary embodiments, the glass article 100 may also be made of glass-based substrates, such as glass-ceramics. "Glass-ceramics" include materials produced through controlled crystallization of glass. In embodiments, glass-ceramics have about 30% to about 90% crystallinity. Non-limiting examples of glass ceramic systems that may be used include $Li_2O \times Al_2O_3 \times nSiO_2$ (i.e. LAS system), $MgO \times Al_2O_3 \times nSiO_2$ (i.e. MAS system), and $ZnO \times Al_2O_3 \times nSiO_2$ (i.e. ZAS system).

As described in more detail below, the glass article 100 is exposed to heat at the surface portions 110 to modify the composition of the glass article 100 in the heated regions. In embodiments, the glass article 100 may be heated using a laser beam 140 to a temperature within a range of about 1100° C. to about 2200° C. Application of a laser beam 140 at the surface portions 110 of the glass article 100 evaporates one or more alkali metals and one or more metalloids present in the surface portions 110, thereby locally modifying the composition of the glass article 100 at the surface portions 110 as compared to a portion of the glass article that is not heated by the laser beam. Therefore, in embodiments, the high temperature modifies the surface portions 110 by reducing an alkali metal concentration and/or a metalloid concentration as compared to the non-heated portion (e.g. the bulk portion 130) of the glass article 100. The modified surface portions 110 have a changed (higher or lower) refractive index as compared to the bulk portion 130. Additionally, the modified surface portions 110 have a lower coefficient of thermal expansion (CTE) than the bulk portions 130. Because of the difference in CTE, as the glass article 100 cools after heating the surface portions 110 with the laser beam 140, the surface portions 110 with the lower alkali concentration contract less than the bulk portion 130, thereby placing the surface of the glass article 100 into compression.

An example method of modifying a composition of a surface portion 110 of a glass article 100 is described. The method includes pre-heating the glass article 100 to a temperature within a range of about 50° C. to about 900° C. In embodiments, the glass article 100 is pre-heated before being exposed to the laser beam 140. The temperature of the pre-heating step is such that a surface portion 110 of the glass article 100 is brought to near an annealing point of the glass article 100. It should be understood that the annealing point of the glass article 100 depends on a thickness and composition of the glass article 100.

The method further includes heating the surface portion 110 of the glass article 100 with a laser beam 140 to a temperature within a range of about 1100° C. to about 2200° C. In exemplary embodiments, the glass article 100 may be heated to a temperature within a range of about 1200° C. to about 2200° C., or of about 1300° C. to about 1800° C., or about 1400° C. to about 1700° C. In embodiments, the laser beam 140 is configured to locally heat desired surface portions 110 of the glass article 100. Localized heating of the surface portions 110 with the laser beam 140 allows precise control of the laser beam 140 over locations of the surface portions 110 that are being exposed to the laser beam 140. In embodiments, the laser beam 140 may be rapidly scanned with a pre-determined scan frequency over the surface portions 110 of a stationary glass article 100. As used herein, "pre-determined scan frequency" is a number of times the laser beam 140 is scanned from a starting location to an ending location and back to the starting location in a given period of time. As a non-limiting example, the pre-determined scan frequency ranges from about 10 kHz-100 Hz. In some embodiments, the surface portions 110 of the glass article 100 may be rapidly scanned relative to the laser beam 140 such that the laser beam 140 is kept stationary. Therefore, other known embodiments may be used that have a relative motion between the laser beam 140 and the glass article 100.

Figure 2:
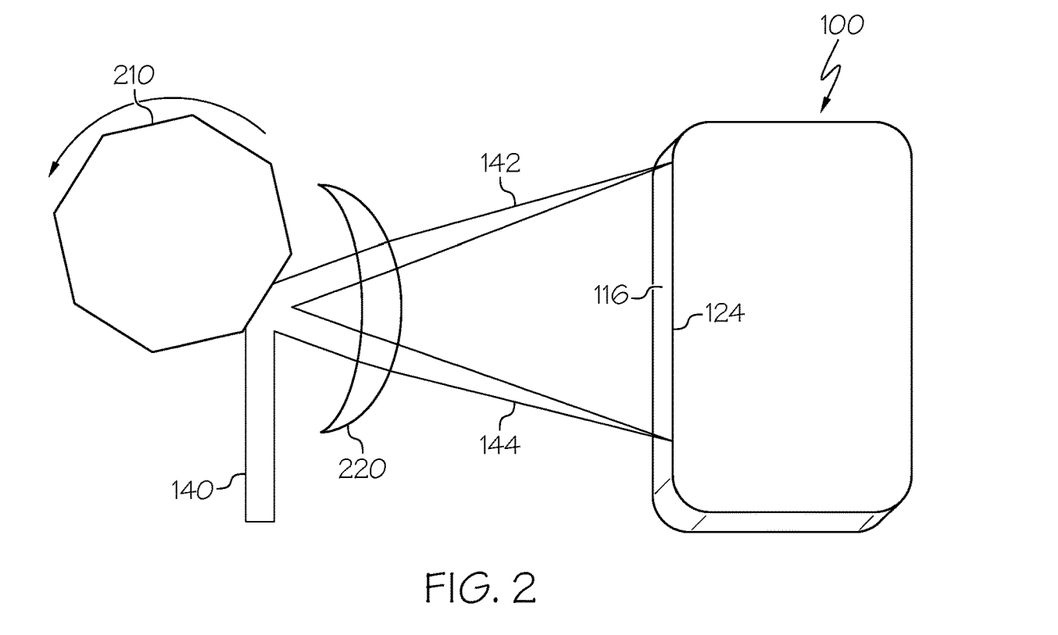
FIG. 2 schematically depicts an example apparatus used for heating surface portions of the glass article with a laser beam, according to one or more embodiments shown and described herein.

Referring to FIG. 2, an example method of heating the surface portions 110 with the laser beam 140 is shown. In embodiments, the surface portions 110 may be edge portions 120 (as shown in FIG. 1). In the illustrated embodiment, edge portions 120 at the minor surface 116 of the glass article 100 are heated with the laser beam 140. The edge portions 120 may be a part of any of the minor surfaces 115, 116, 117, 118. As a non-limiting example, an edge portion 120 extends from a first edge 122 (and/or second edge 124, and/or third edge 126 and/or fourth edge 128) of the glass article 100 to a pre-determined depth towards the bulk portion 130. In embodiments, the edge portion 120 may extend up to 1 μm, or up to 10 μm, or up to 15 μm from the edge 122 of the glass article 100 towards the bulk portion 130.

In the example illustrated in FIG. 2, the laser beam 140 is directed and scanned towards the edge portions 120 of the glass article 100 using a rotating polygon mirror 210 and a lens 220. The laser beam 140 is first directed towards the rotating polygon mirror 210, which directs the laser beam 140 into two beams 142 and 144 through the lens 220. The lens 220 assists in localized heating of the glass article 100 with the laser beam 140, by focusing the laser beams 142, 144 through the lens 220.

As non-limiting examples, the laser beam 140 is emitted by a carbon dioxide laser, carbon monoxide laser, an excimer laser, or other well-known industrial lasers. Further, various gas lasers or solid-state lasers may also be used to generate the laser beam 140. In some embodiments, the laser beam 140 may be a pulsed laser beam or a continuous laser beam. Further, lasers that are able to heat surfaces to a temperature within a range of about 1100° C. to about 2200° C. may be used. The wavelength of the laser beam 140 is not particularly limited. As non-limiting examples, the laser beam 140 may have a wavelength within a range of about 1 μm to 100 μm, or 5 μm to 15 μm. Additionally, well known or yet-to-be developed lasers may also be used.

The temperature of the glass article 100 at the surface portions 110 which are exposed to the laser beam 140 may be controlled by various properties of the laser beam 140, in addition to scan frequency and wavelength of the laser beam 140. Some non-limiting exemplary properties include laser power density and exposure time of the laser beam 140 on the surface portions 110 of the glass article 100. In non-limiting examples, the laser power density of the laser beam 140 is within a range of about 1 W/mm$^2$ to about 10 W/mm$^2$. In some embodiments, the laser power density of the laser beam 140 is within a range of about 2 W/mm$^2$ to about 5 W/mm$^2$. With respect to exposure times of the laser beam 140, the time may be within a range of about 0.1 seconds to about 100 seconds. In some embodiments, the exposure time of the laser beam 140 may be within a range of about 2 second to about 4 seconds. The exposure time should be long enough to evaporate the one or more alkali metals or the one or more metalloids to the desired concentration level.

In FIG. 2, the rotating polygon mirror 210 is used to steer the laser beam 140 through the lens 220, and towards the glass article 100. The rotating polygon mirror 210 is arranged such that it directs the laser beam 140 incident on it towards the lens 220. In embodiments, the rotating polygon mirror 210 rotates in a clockwise or anticlockwise direction, wherein the rotation can be periodic or continuous. Due to the rotation of the polygon mirror 210, the laser beam 140 may be steered to be incident on the glass article 100 at different edge portions 120 of the second edge 124. In FIG. 2, the rotating polygon mirror 210 is shown to have 8 sides, however, other embodiments may have any suitable number of sides, for example from 4 to 16 sides. In some embodiments, the scan frequency of the laser beam 140 may depend on the rotation of the rotating polygon mirror 210. In embodiments, the scan frequency of the laser beam 140 may be such that the time between the scans is short compared to the thermal diffusion time of the glass. As a non-limiting example, the laser beam 140 may have a scan frequency that is within a range of about 10 kHz-100 Hz. In embodiments, other scanning devices that are presently known or yet to be developed may also be used to steer the laser beam 140 towards the surface portions 110 of the glass article 100.

The glass article 100 may be exposed to the laser beam 140 only at selected portions of the minor surface 116, for example. The laser beam 140 is directed to the selected portions on the minor surface using the lens 220. In embodiments, the lens 220 is crescent-shaped. The glass article 100 is positioned such that the laser beam 140 is incident on the glass article 100 at the edge portions 120 of the glass article 100. While FIG. 2 shows the laser beam 140 being incident on the minor surface 116, glass article 100 may be positioned such that the laser beam 140 is incident on surface portions 110 of major surfaces 112, 114. As shown in FIG. 2, the crescent-shaped lens 220 is configured such that a focal point of the laser beam 140 is at the edge 124 of the glass article 100 no matter what the angle of incidence of the laser beam 140 on the lens 220. In some embodiments, the lens 220 is an f-theta lens.

Figure 3:
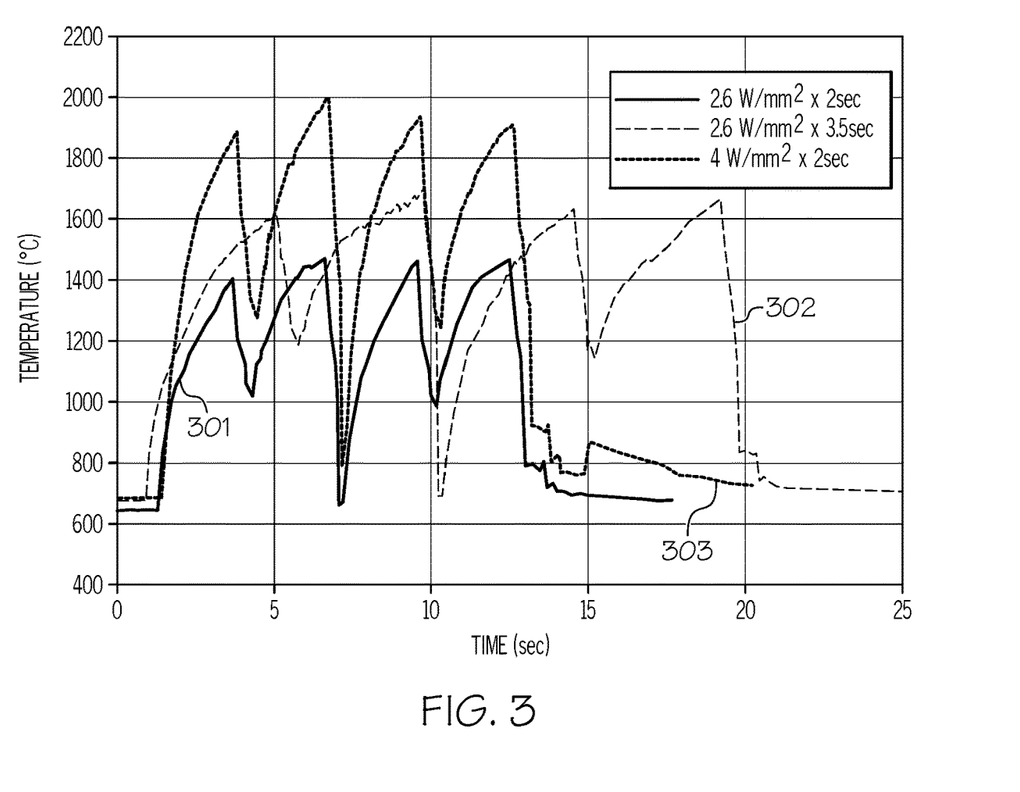
FIG. 3 is a graph depicting temperatures obtained at the surface portions when laser beams with varying laser power densities and exposure times are used, according to one or more embodiments shown and described herein.

Referring now to FIG. 3, a graph depicting different glass temperatures at surface portions 110 of the glass article 100 for different laser beam properties is shown. In the illustrated example, the glass article was made of an alkali-borosilicate glass. Specifically, an alkali-borosilicate glass was used having the following composition based on oxide mol %: 64.5% $SiO_2$; 7% $B_2O_3$; 13.9% $Al_2O_3$; 14% $Na_2O$; 0.5% $K_2O$; 0.03% $Fe_2O_3$; 0.04% $SnO_2$; and 0.004% $TiO_2$. The temperature of the surface portions 110 were in a range of between 600° C. to about 2200° C. for a duration of time. Laser beams 140 with different laser beam properties were applied to the surface portions 110 of the glass article 100. Each of the laser beams 140 depicted in curves 301, 302 and 303 were exposed to a glass article 100 having four minor surfaces. The wavelength of the laser beam 140 was 10.6 μm. The laser was scanned along the minor surfaces of the glass article 100 at a rate of 1000 times/second. Further, the thickness of the glass article 100 was about 0.6 mm.

At curve 301, the laser power density applied was 2.6 W/mm$^2$ and the exposure time was 2 seconds. At curve 302, the laser power density applied was 2.6 W/mm$^2$ and the exposure time was 3.5 seconds. At curve 303, the laser power density applied was 4 W/mm$^2$ and the exposure time was 2 seconds. It was observed that at curve 301, the highest temperature obtained at the surface portions 110 was between about 1400° C. to about 1500° C. At curve 302, the highest temperature obtained at the surface portions 110 was between about 1600° C. to about 1700° C. Further, at curve 303, the highest temperature obtained at the surface portions 110 was about 2000° C. The temperature of the surface portions 110 of the glass article 100 was measured at the surface portions 110 using a thermal camera. The thermal camera is a device that measures temperature of an object by measuring the black body radiation emitted by the object.

At curve 301, for example, the laser beam 140 took about one second to heat, and one minor surface (e.g. minor surface 116) of the glass article 100 was heated for the exposure time of 2 seconds, the glass article was then rotated and the next minor surface (e.g. minor surface 118) was heated for 2 seconds. This process was repeated for the other two minor surfaces (115, 117) of the glass article 100. Each of the four peaks (i.e. when the temperature of the laser beam 140 of curve 301 reaches over 1400° C.) indicates the temperature at each minor surface of the glass article 100 being over 1400° C. Therefore, depending on at least properties such as the laser power density and the exposure time, the temperature at the surface portions 110 was controlled.

Figure 4A:
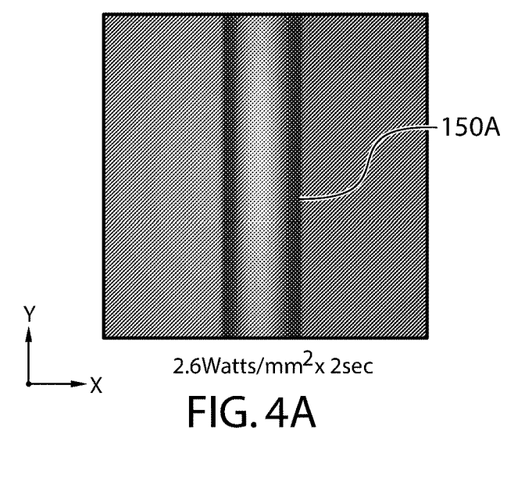
FIGS. 4A-C depict finished portions of glass articles, according to one or more embodiments shown and described herein.
Figure 4B:
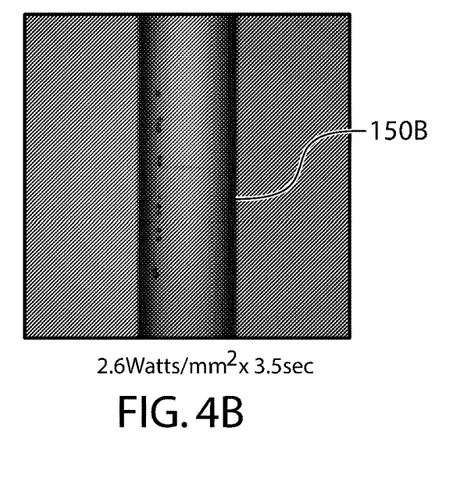
Figure 4C:
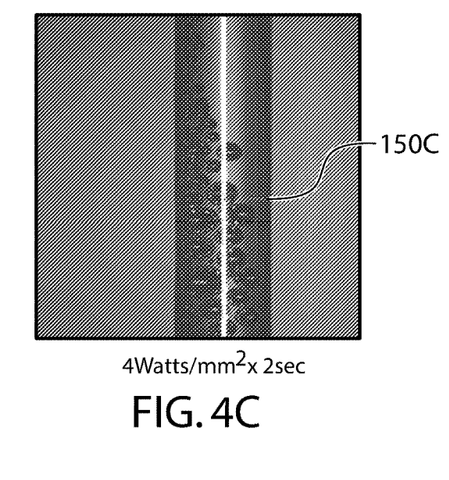

By heating the surface portions 110 with the laser beam 140 at varying laser power density and exposure times as discussed with respect to FIG. 3, high temperatures (i.e. within a range of about 1100° C. to about 2000° C.) were obtained at the surface portions 110. At such temperatures, it was observed that the glass at the surface portions 110 softens and flows under surface tension so that finished portions 150A, 150B, 150C were formed. As a non-limiting example, thickness of the finished portions 150A, 150B, 150C may be within a range of about 0.1-10 µm. Examples of finished portions 150A, 150B, 150C are shown in FIGS. 4A-C. Specifically, FIGS. 4A-C depicts a top view of one minor surface (for example 115, 116, 117, or 118) of the glass article 100 after the laser beam 140 has been applied to the glass article 100. After application of the laser beam 140, the finished portions 150A, 150B, 150C as shown in FIGS. 4A-C were cut horizontally (i.e. across an x-axis) to obtain a horizontal cross section 160A, 160B, 160C of the finished portions 150A, 150B, 150C. That is, ends of the glass article 100 shown in FIGS. 5A-C correspond to a center of the minor surface shown in FIGS. 4A-C, respectively.

Figure 5A:
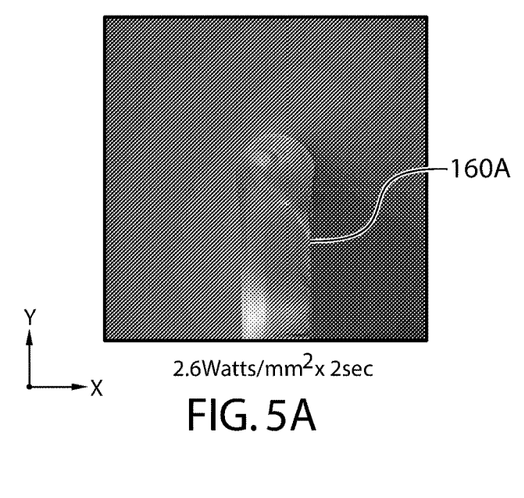
FIGS. 5A-C depict cross-sections of finished portions of glass articles, according to one or more embodiments shown and described herein.
Figure 5B:
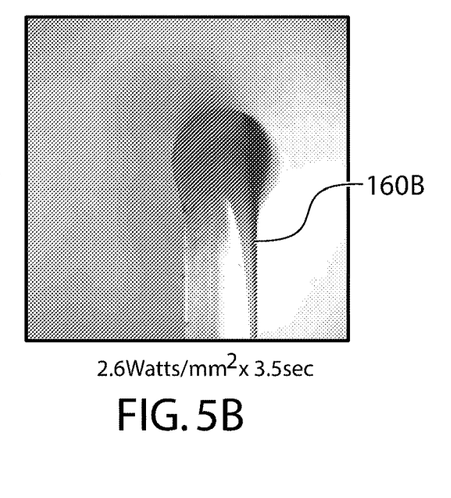
Figure 5C:
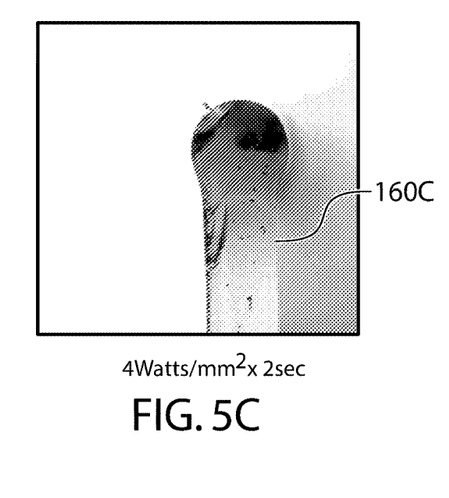

As used herein, "finished portions" are surface portions 110 that have been exposed to the laser beam 140 for a pre-determined amount of time. For example, the exposure of the laser beam 140 on the surface portions 110 as depicted by curve 301 of FIG. 3 resulted in a finished portion 150A shown in FIG. 4A. The cross-section of the finished portion 160A is shown in FIG. 5A. Further, exposure of the laser beam 140 on the surface portions 110 as depicted by curve 302 of FIG. 3, resulted in a finished portion 150B shown in FIG. 4B, and cross-section of the finished portion 160B shown in FIG. 5B. Similarly, exposure of the laser beam 140 on the surface portions 110 depicted by curve 303 of FIG. 3 resulted in a finished portion 150C shown in FIG. 4B, and cross-section of the finished portion 160C shown in FIG. 5C. As can be seen in FIGS. 4A-C, and FIGS. 5A-C, as the laser power density and the exposure time increases, the quality of the finished portion 150 deteriorated due to an increase in air bubbles and bulging at the surface portions 110. For example, the amount of air bubbles in the finished portions 150A-C progressively increases with the increase in laser power density and/or exposure time. Further, as evidenced in FIGS. 5A-C, the bulging at the horizontal cross section 160A, 160B, 160C of the finished portions 150A, 150B, 150C also varies with laser power density and/or exposure time. Accordingly, the amount of air bubbles and/or the amount of bulging at the horizontal cross section 160A-C in the finished portions 150A-C may be controlled by adjusting the laser power density and/or exposure time of the laser beam 140.

The heating of the surface portions 110 of the glass article 100 with the laser beam 140 causes one or more metalloids and/or one or more alkali metals present at the surface portions 110 to be evaporated. In embodiments, the one or more alkali metals and/or the one or more metalloids evaporate in the form of oxides or alkali borates. As used herein, the term "evaporate" with respect to the evaporation of one or more alkali metals and/or one or more metalloids is the conversion of the one or more alkali metals or the one or more metalloids present in the glass article 100 into a gaseous state. Depending on the composition of the glass article 100, the one or more alkali metals may be lithium, sodium, potassium, rubidium, or cesium. Further, in embodiments, the one or more metalloids may be boron, silicon, germanium, arsenic, antimony, or tellurium. Further, in exemplary embodiments, the one or more alkali metals and the one or more metalloids may be evaporated as free-elements, or as alkali metal compounds or metalloid compounds. In addition to the one or more alkali metals, and the one or more metalloids, in exemplary embodiments, metals such as zinc, and indium, and non-metals such as phosphorus may also be evaporated by the laser beam 140. In some embodiments, zinc, indium and phosphorus may be evaporated in their free state or in the form of compounds such as ZnO, $In_2O_3$, and $P_2O_5$ respectively.

The heating of the surface portions 110 of the glass article 100 with the laser beam 140 modifies the composition of the surface portion 110 such that the surface portion 110 has a lower alkali metal concentration and/or a lower metalloid concentration as compared to a portion of the glass that is not heated by the laser beam 140. As a non-limiting example, the alkali metal concentration or the metalloid concentration at the surface portion 110 may be in a range of 50% to 99.9% lower than the alkali metal concentration or the metalloid concentration at the bulk portion 130 of the glass article 100. As another non-limiting example, the alkali metal concentration or the metalloid concentration at the surface portion 110 may be about 80% lower than the alkali metal concentration or the metalloid concentration at the bulk portion 130 of the glass article 100. As another non-limiting example, the alkali metal concentration or the metalloid concentration at the surface portion 110 may be about 95% lower than the alkali metal concentration or the metalloid concentration at the bulk portion 130 of the glass article 100.

Figure 6:
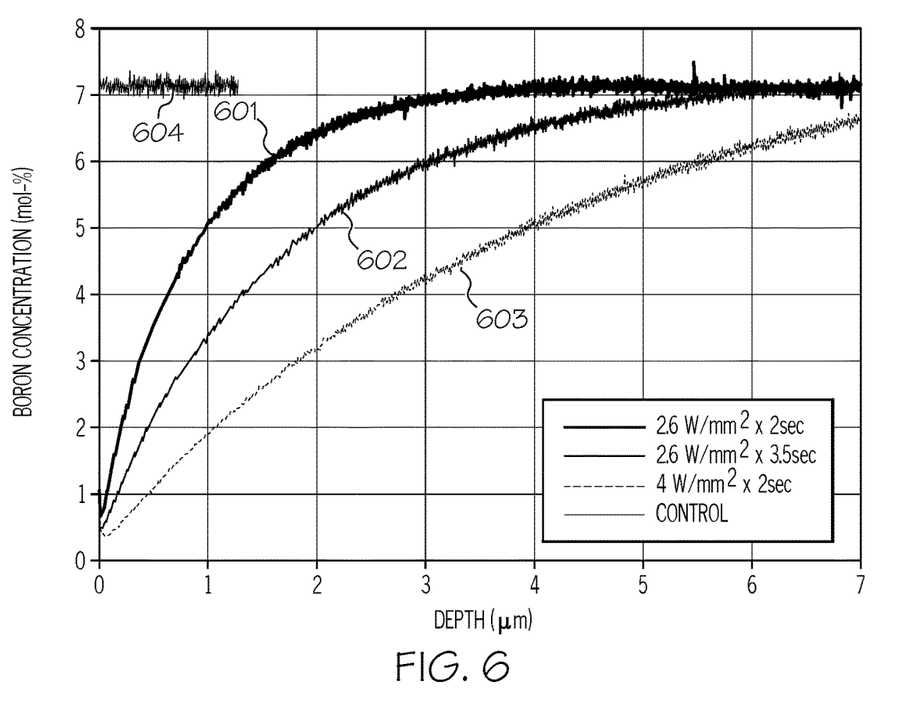
FIG. 6 graphically depicts a concentration of boron as a function of depth in a laser heated surface portion of a glass article, according to one or more embodiments shown and described herein.
Figure 7:
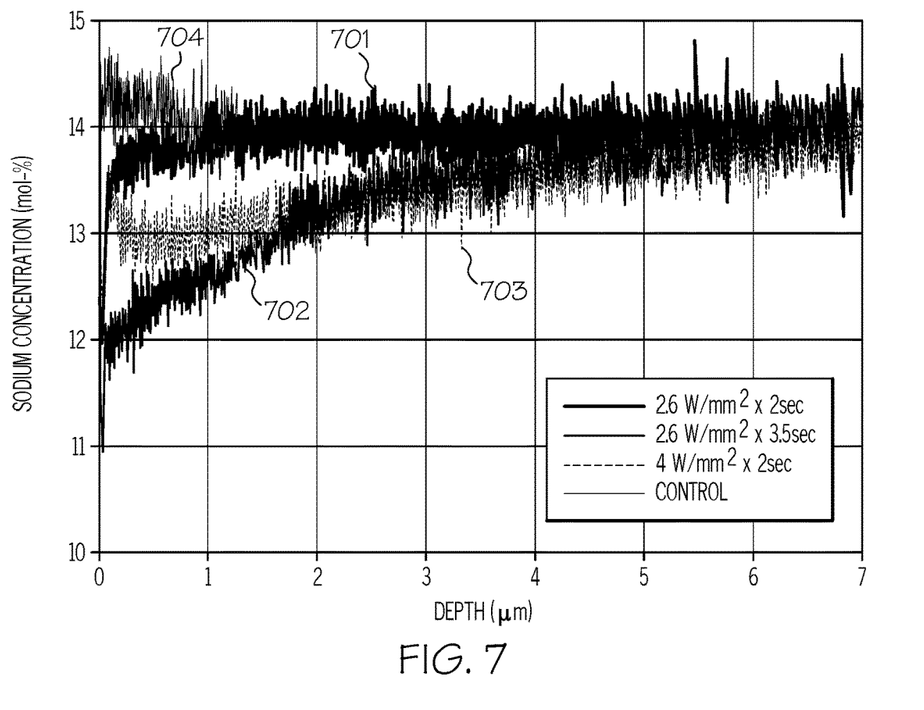
FIG. 7 graphically depicts analyzing a concentration of sodium as a function of depth in a laser heated surface portion, according to one or more embodiments shown and described herein.

An example modification of the composition of surface portions 110 of the glass article 100 may be seen in FIGS. 6 and 7. Referring to FIG. 6, an analysis of laser heated surface portions 110 performed using secondary ion mass spectroscopy (SIMS) is shown. In the illustrated example, the glass article 100 used was an alkali-borosilicate glass having the following composition based on oxide mol %: 64.5% $SiO_2$; 7% $B_2O_3$; 13.9% $Al_2O_3$; 14% $Na_2O$; 0.5% $K_2O$; 0.03% $Fe_2O_3$; 0.04% $SnO_2$; and 0.004% $TiO_2$. The y-axis of the graph shown in FIG. 6 depicts a concentration of boron, a metalloid present in the glass article 100 when the glass article 100 is exposed to laser beam 140. The x-axis represents the depth of the glass article 100 in micrometers, where the edge (for example, edge 122) has 0 µm depth, and the glass article 100 in the illustrated example is shown to have a depth of at least 7 µm. Laser beams of various laser power density and exposure times were applied to the surface portions 110 of the glass article 100. At curve 601, the laser power density applied was 2.6 W/mm² and the exposure time was 2 seconds. At curve 602, the laser power density applied was 2.6 W/mm² and the exposure time was 3.5 seconds. At curve 603, the laser power density applied was 4 W/mm² and the exposure time was 2 seconds. Curve 604 represents the control, i.e. the concentration of boron within the glass article 100 before the application of the laser beam 140. The wavelength of the laser beams represented in curves 601, 602 and 603 was 10.6 µm. The laser beam 140 was scanned along the minor surfaces of the glass article 100 at a rate of 1000 times/second. Further, the thickness of the glass article 100 was about 0.6 mm. After applying the laser beams 140 to the surface portions 110 of the glass article 100, it was seen that the boron concentration is almost 0 mol % at the edge 122 where the depth is 0 µm. As the boron concentration was measured from the edge 122 toward the bulk portion 130 of the glass article 100, the boron concentration increases. Therefore, it was observed that the application of the laser beam 140 on the surface portions 110 of the glass article 100 modifies the composition of the glass article 100, by evaporating boron, thereby reducing the presence of boron within the surface portions 110. Further, the modification occurred only at the surface portions 110 of the glass article 100, as opposed to within the bulk portion. It was seen that the concentration of boron at the bulk portion 130, where the depth is, for example 7 μm (for curves 601, 602, for example), was the same as the boron concentration of the glass article 100 before the laser beam 140 was applied (i.e. curve 604).

As an example and not a limitation, the lowering of metalloid concentration may be desirable because glass articles 100 having lower metalloid concentration at the finished portions 150 may be used as optical waveguides for propagating optical signals of light. It has been found that the presence of one or more metalloids, such as boron, in silicate glass lowers the refractive index of the silicate glass. Therefore, lowering the metalloid concentration at the surface portions 110 using the laser beam 140 will result in the finished portion 150 having a higher refractive index than the bulk portion 130 of the glass article 100. In some embodiments, the glass article 100 may also be used as an optical waveguide after the lowering of alkali metals concentration, where the evaporation of alkali metals decreases the refractive index of the finished portions 150 as compared to the bulk portion 130 of the glass article 100. In exemplary embodiments, the change in refractive index may be measured with commercially available instruments such as a Metricon, which allow measurements the refractive index of glass articles 100. The change in refractive index (increase or decrease) at the finished portion 150 as compared to the bulk portions 130 of the glass article 100 may be utilized to form an optical waveguide. Such optical waveguides may be used to transmit light and signals through the glass article 100.

Additionally, the lowering of metalloid concentration may also be desirable because glass having lower metalloid concentration is more receptive to ion-exchange process for chemical strengthening of glass. Ion-exchange strengthening may be performed by immersing the glass in a molten salt bath containing alkali ions to facilitate the exchange of larger alkali ions in the molten salt bath (such as potassium ions) with smaller alkali ions in the glass (such as sodium ions) such that a compressive stress is formed in the surfaces of the glass. It has been found that the presence of boron in glass slows down the ion exchange process and lowers the achievable compressive stress of the glass. By evaporating boron from the surface portions 110 of the glass article, the finished portion 150 will ion exchange faster and to higher compressive stress values, thereby providing more protection to the surface portions 110 which are most susceptible to damage.

Still referring to FIG. 6, the lowering of the concentration of one or more metalloids such as boron from the surface portions 110 also affects the coefficient of thermal expansion of the glass article 100. When the surface portions 110 are heated with the laser beam 140, the metalloid concentration at the surface portions 110 decreases, which thereby increases the coefficient of thermal expansion at the surface portions 110 of the glass article 100. In non-limiting exemplary embodiments, this glass article 100 may be annealed to remove stress induced by the laser beam 140 such that the finished portion 150 is put into tension as the glass article 100 cools. In embodiments, alternative compositions may be used that would give a residual compressive stress at the surface portions 110.

Referring now to FIG. 7, an analysis of laser heated surface portions 110 using secondary ion mass spectroscopy (SIMS) is shown. In the illustrated example, the glass article 100 used was an alkali-borosilicate glass having the following composition based on oxide mol %: 64.5% $SiO_2$; 7% $B_2O_3$; 13.9% $Al_2O_3$; 14% $Na_2O$; 0.5% $K_2O$; 0.03% $Fe_2O_3$; 0.04% $SnO_2$; and 0.004% $TiO_2$. The y-axis of the graph shown in FIG. 7 represents a concentration of sodium, an alkali metal present in the glass article 100, after the glass article 100 was exposed to laser beam 140 using various power densities and exposure times. The x-axis represents the depth of the glass article 100 in micrometers, where the edge (for example, edge 122) has 0 μm depth, and the glass article 100 in the illustrated example had a depth of at least 7 μm. Laser beams of various laser power density and exposure times were applied to the surface portions 110 of the glass article 100. At curve 701, the laser power density applied was 2.6 W/mm$^2$ and the exposure time was 2 seconds. At curve 702, the laser power density applied was 2.6 W/mm$^2$ and the exposure time was 3.5 seconds. At curve 703, the laser power density applied was 4 W/mm$^2$ and the exposure time was 2 seconds. Curve 704 represents the control, i.e. the concentration of sodium within the glass article 100 before application of the laser beam 140. The wavelength of the laser beams represented in curves 701, 702 and 703 was 10.6 μm. The laser beam 140 was scanned along the minor surfaces of the glass article 100 at a rate of 1000 times/second. Further, the thickness of the glass article 100 used was about 0.6 mm. After applying the laser beams 140 to the surface portions 110 of the glass article 100, it was seen that the sodium concentration reduced from 14 mol % to about 12 mol % at the edge 122 where the depth was 0 μm. As the sodium concentration was measured from the edge 122, 124, 126, 128 towards the bulk portion 130 of the glass article 100 (i.e. as the depth increases), the sodium concentration progressively increased. Therefore, it was observed that the application of the laser beam 140 on the surface portions 110 of the glass article 100 modified the composition of the glass article 100, by evaporating sodium, thereby reducing the presence of sodium within the surface portions 110. Further, the modification occurred only at the surface portions 110 of the glass article 100, because it was seen that the concentration of sodium at the bulk portion 130 was the same as the sodium concentration of the glass article 100 before the laser beam 140 was applied (i.e. curve 704).

The lowering of the concentration of one or more alkali metals such as sodium from the surface portions 110 may be desirable because it reduces the refractive index at the surface portions 110 as compared to the bulk portion 130. Additionally, the lowering of one or more alkali metals such as sodium from the surface portions 110 may also be desirable because it reduces the coefficient of thermal expansion of the glass article 100. In some embodiments, the coefficient of thermal expansion of the edge portion 120 is lower than a coefficient of thermal expansion of the bulk portion 130 of the glass article by at least 0.1 ppm/° C. In exemplary embodiments, the change in CTE may be measured by measuring the birefringence that results from the change in CTE. Birefringence is measured optically using polarized light, and may be measured using commercially available instruments such as Metricon. Further, as the glass article 100 cools after being heated by the laser beam 140, the finished portion 150 with reduced alkali concentration as compared to the bulk portion 130 will contract less than the bulk portion 130, and will be placed into compression. This compression in the surface portions increases the strength of the glass article 100, thereby preventing flaws or scratches at the surface portions 110 from growing.

Therefore, as evidenced in FIGS. 6 and 7, the surface portion 110 has a lower alkali metal concentration and/or a lower metalloid concentration as compared to a portion of the glass that is not heated by the laser beam 140. Additionally, in embodiments, the edge portion 120 heated with the laser beam 140 may have a lower alkali metal concentration and/or a lower metalloid concentration as compared to the bulk portion 130. In these embodiments, the alkali metal concentration or metalloid concentration is reduced at the edge portion 120 by heating the edge portion 120 with the laser beam 140 to a temperature within a range of about 1100° C. to about 2200° C. to compositionally modify the edge portion 120. Further, in non-limiting exemplary embodiments, a treated portion 180 that is the portion of the glass article exposed to the laser beam 140, has a lower alkali metal concentration and/or a lower metalloid concentration as compared to the non-treated portion 182, where the non-treated portion 182 and the treated portion 180 are adjacent to each other.

Due to the compositional modification of surface portions 110 of glass articles 100, as compared to the bulk portions 130, these glass articles 100 may be used in a variety of devices such as optical waveguides, optical connectors, optical links, protective covers for electronic devices, touch screen sensors, and the like. For example, FIG. 8 depicts the use of the glass article 100 with an optical waveguide, and FIG. 9 depicts the glass article 100 as used as a glass cover for an electronic display.

Figure 8:
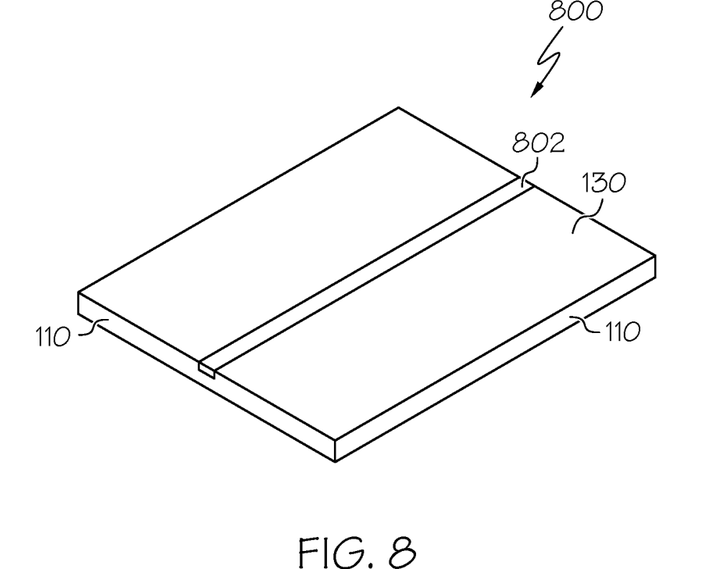
FIG. 8 depicts an optical waveguide disposed within the surface portion and/or the bulk portion of the glass article, according to one or more embodiments shown and described herein.

Referring now to FIG. 8, a glass article 800 with an optical waveguide 802 disposed within the glass article 800 is shown. The glass article 800 includes a bulk portion 130 and a surface portion 110, surrounding the bulk portion 130, the surface portion 110 having a lower alkali metal concentration and/or a lower metalloid concentration as compared to the bulk portion 130. The surface portion 110 is heated with the laser beam 140 to a temperature within a range of about 1100° C. to about 2000° C. to evaporate one or more metalloids and/or one or more alkali metals present at the surface portion 110 such that the surface portion 110 has a lower alkali metal concentration and/or a lower metalloid concentration. Further, the optical waveguide 802 is disposed within at least one of the surface portion 110 and the bulk portion 130 such that the optical waveguide 802 is operable to propagate optical signals therein.

Figure 9:
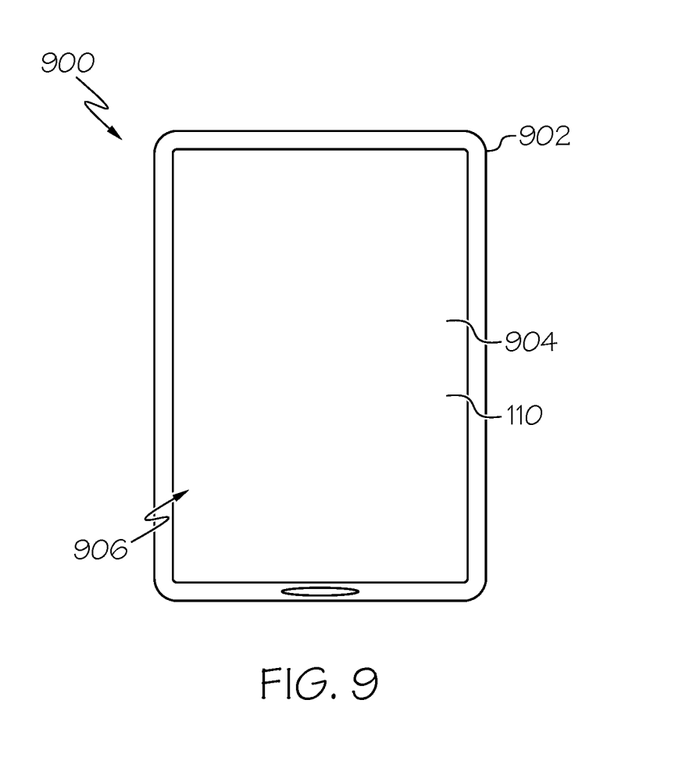
FIG. 9 depicts an electronic device having an electronic display, and a glass cover disposed over the electronic display, according to one or more embodiments shown and described herein.

Referring now to FIG. 9, an electronic device 900 is depicted, the electronic device 900 having a housing 902 and an electronic display 904, a processor (not shown) and a memory (not shown). The electronic display 904 includes a glass cover 906 which includes a surface portion 110 and a bulk portion, where the surface portion 110 has a lower alkali metal concentration and/or a lower metalloid concentration as compared to the bulk portion 130. The surface portion 110 of the glass cover 906 is heated with the laser beam 140 to a temperature within a range of about 1100° C. to about 2200° C. to evaporate one or more metalloids and/or one or more alkali metals present at the surface portion 110 such that the surface portion 110 has a lower alkali metal concentration and/or a lower metalloid concentration. In example embodiments, the glass cover 906 may also be used as a touch screen display, for the electronic device 900.

It should now be understood that embodiments described herein are directed to glass articles and methods of modifying a composition of a surface portion of glass articles are discussed. A surface portion of the glass article is heated with a laser beam to a temperature within a range of about 1100° C. to about 2200° C. to evaporate one or more metalloids and/or one or more alkali metals present at the surface portion. This modifies the composition of the surface portion such that the surface portion has a lower alkali metal concentration and/or a lower metalloid concentration as compared to a portion of the glass article that has not been heated by the laser beam. The modified surface portions or the finished portions have a changed refractive index and a lower coefficient of thermal expansion than the portion of the glass article that is not heated by the laser beam. Such glass or glass based articles may be used as optical waveguides for transmission of light or signals, in optical assemblies, optical connectors, optical links, glass cover for electronic devices, touch screen sensors, and the like.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A method of modifying a composition of a surface portion of a glass article, the method comprising heating the surface portion of the glass article with a laser beam to a temperature within a range of 1100° C. to 2200° C., such that the heating evaporates one or more metalloids and/or one or more alkali metals present at the surface portion, and modifies the composition of the surface portion such that the surface portion comprises a lower alkali metals concentration and/or a lower metalloids concentration as compared to a portion of the glass article that is not heated by the laser beam, wherein the surface portion is not an entire major or minor surface of the article.

2. The method of claim 1, further comprising preheating the glass article to a temperature within a range of 50° C. to 900° C. before heating the surface portion of the glass article with the laser beam.

3. The method of claim 1, wherein heating the surface portion of the glass article with the laser beam comprises scanning the laser beam along the surface portion of the glass article using a rotating polygon mirror.

4. The method of any one of claim 1, wherein the laser beam has a scan frequency within a range of 10 kHz to 100 Hz.

5. The method of any one of claim 1, wherein the laser beam is focused on the surface portion of the glass article using an f-theta lens.

6. The method of any one of claim 1, wherein the laser beam is a $CO_2$ laser beam.

7. The method of claim 1, wherein the laser beam has a wavelength within a range of 5 µm to 15 µm.

8. The method of claim 1, wherein the surface portion of the glass article is an edge portion, such that the edge portion extends from an edge of the glass article to a pre-determined depth towards a bulk portion of the glass article.

9. The method of claim 8, wherein the edge portion extends 10 µm or less from the edge of the glass article.

10. The method of claim 1, wherein the one or more alkali metals are one or more of lithium, sodium, potassium, rubidium, and cesium, and the one or more metalloids are one or more of boron, silicon, and germanium, arsenic, antimony, and tellurium.

11. The method of claim 1, wherein a laser power density of the laser beam is within a range of 1 $W/mm^2$ to 10 $W/mm^2$.

12. The method of claim 1, wherein the one or more metalloids is boron, and the surface portion of the glass article has a higher refractive index than the portion of the glass article that is not heated by the laser beam.

13. The method of claim 1, wherein the surface portion of the glass article has a lower coefficient of thermal expansion than the portion of the glass article that is not heated by the laser beam.

* * * * *

UNITED STATES PATENT AND TRADEMARK OFFICE
CERTIFICATE OF CORRECTION

PATENT NO. : 11,236,017 B2
APPLICATION NO. : 16/334948
DATED : February 1, 2022
INVENTOR(S) : Matthew John Dejneka et al.

Page 1 of 1

It is certified that error appears in the above-identified patent and that said Letters Patent is hereby corrected as shown below:

On the Title Page

In item (57), in Column 2, in "Abstract", Line 5, delete "1100?C" and insert -- 1100° C. --.

In item (57), in Column 2, in "Abstract", Line 5, delete "2200?C" and insert -- 2200° C. --.

In the Claims

In Column 12, Line 44, in Claim 4, delete "of any one of" and insert -- of --.

In Column 12, Line 47, in Claim 5, delete "of any one of" and insert -- of --.

In Column 12, Line 50, in Claim 6, delete "of any one of" and insert -- of --.

Signed and Sealed this
Seventh Day of January, 2025

Derrick Brent
*Acting Director of the United States Patent and Trademark Office*